Feb. 24, 1953 H. FEINSTEIN 2,629,781

TELEPHONE CALL COUNTING DEVICE

Filed May 21, 1948 2 SHEETS—SHEET 1

INVENTOR.
Henry Feinstein
BY Mock & Blum
ATTORNEYS

INVENTOR.
*Henry Feinstein*
BY *Mock & Blum*
ATTORNEYS

Patented Feb. 24, 1953 2,629,781

UNITED STATES PATENT OFFICE 2,629,781

TELEPHONE CALL COUNTING DEVICE

Henry Feinstein, Brooklyn, N. Y.

Application May 21, 1948, Serial No. 28,349

20 Claims. (Cl. 179—7.1)

This invention relates to a telephone call counting device and to a telephone call timing device which coacts therewith, both devices being mountable adjacent to a dial actuated telephone.

A definite need has been felt, for a long time, for a device which is readily mountable adjacent to a dial operated telephone to count the number of calls which are made on the telephone and to time each individual call if it is a two or three message rate call. Especially is this need felt wherever private dial telephones are used, and in larger offices where more than one person uses the same telephone, and where long distance telephone calls are frequently made. In many telephone contracts a given number of calls are permitted for a given flat rate. Additional calls require additional payment. It is therefore frequently highly desirable to know how many calls were made in a given period of time so that it will be known how many additional calls may be made within the flat rate range. Where long distance calls are made telephone company charges are based upon the time consumed during each telephone call. Hence it is equally helpful to be apprised, during the course of each such telephone conversation, of the time which has elapsed since the telephone connection was made.

It is accordingly the principal object of this invention to provide the means of counting the number of telephone calls which are made on a dial telephone and of timing each such call made.

It is also an important object of this invention to provide means comprising a device which may very readily be used in conjunction with a dial telephone having any type or shape of base without in any way interfering with the operation of the telephone and without in any way violating the rules of the several telephone companies relative to encumbering their telephones with unauthorized attachments.

A further object of this invention is to provide a telephone call counting and timing device which will be relatively economical to manufacture.

A preferred embodiment of this invention is shown in the accompanying drawing in which.

It has been stated that the invention herein claimed comprises a telephone call counting device and also a telephone call timing device. These two devices are not separate and distinct from each other. The same actuating member which actuates the one, simultaneously and by the same movement, actuates the other. It is clear therefore that the two devices are but two facets of the same mechanism. For purposes of convenience and clarity, however, the invention will be described firstly in terms of its counting features and secondly in terms of its timing features.

Figures 6, 7:
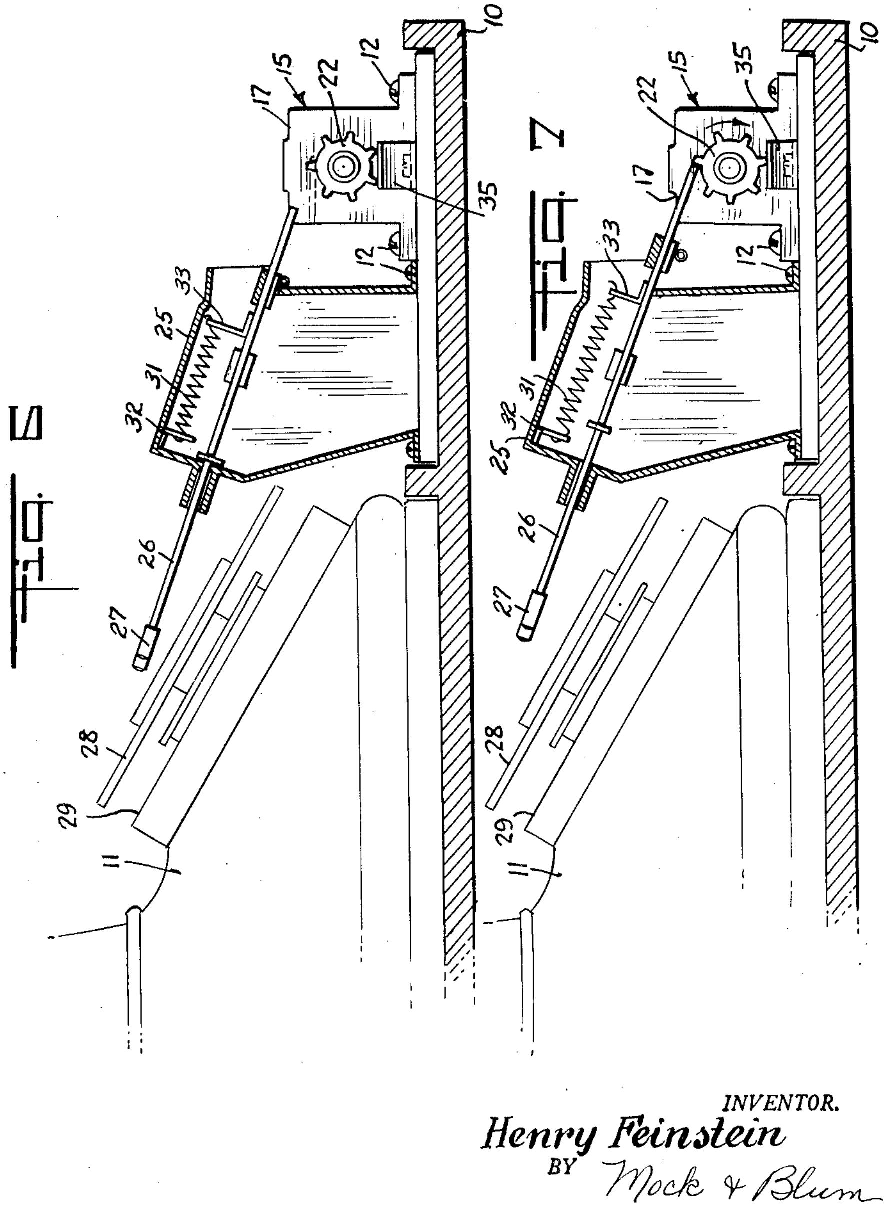
Fig. 6 is a side view, partly in vertical section, of the means which actuate both the counting and the timing mechanisms, also showing a side view of said counting mechanism.
Fig. 7 is a view similar to that of Fig. 6 showing how the actuating means engages the counting mechanism.

Referring now to the counting aspects of the present invention, it will be noted in Figs. 6 and 7 that a base 10 is provided not only for the counting mechanism, shortly to be described, but also for the dial telephone 11 itself. The said base supports both the telephone and the counting mechanism, but only the counting mechanism is fastened to the base, as by means of screws 12. The telephone merely rests on the base and is removable therefrom at will.

Figures 1, 2, 3, 4, 5:
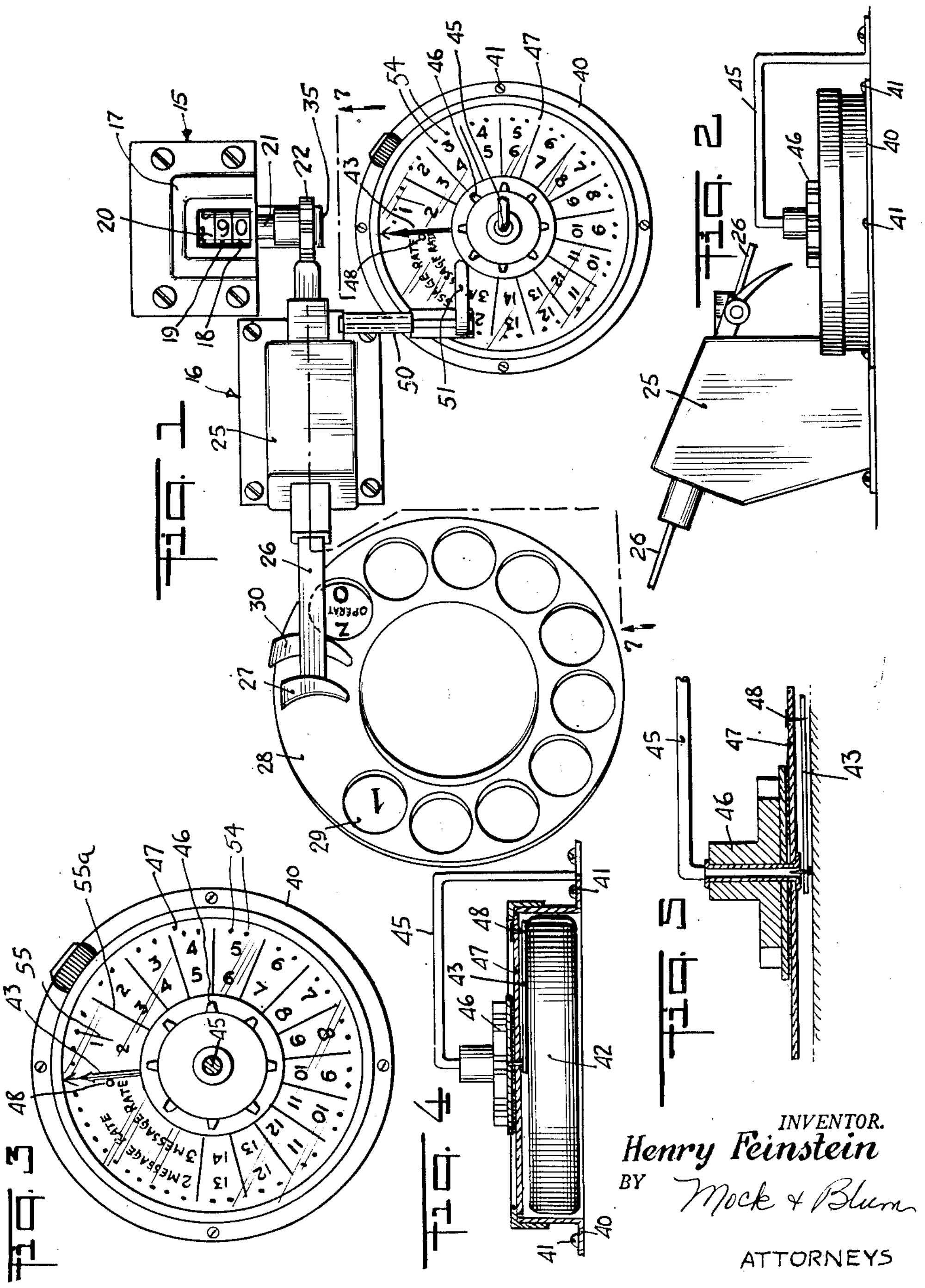
Fig. 1 is a plan view of the device herein claimed showing it in operative position relative to the dial on a dial telephone.
Fig. 2 is a side view of said device.
Fig. 3 is a top view of the time dial of said device.
Fig. 4 is a vertical section through the timing means of the device herein claimed.
Fig. 5 is a fragmentary, enlarged vertical section through said timing device.

It will be seen in Figs. 1 and 6 that the counting mechanism comprises two major elements: the counter proper 15 and the actuating means 16 by which said counter is actuated. Counter 15 includes its own housing 17 which houses a conventional counting mechanism which is not shown in the drawing, for the reason that its specific features are not herein being claimed. This counting mechanism has a plurality of dials 18, 19 and 20 respectively. These dials are connected to the counting mechanism in the usual manner and it will be understood that when the counting mechanism is actuated these dials are themselves caused to rotate on a common axis. Dial 20 makes a complete revolution before dial 19 will turn the angular distance from one digit to another. By the same token dial 19 makes a complete revolution before dial 18 moves the distance from one of its digits to the next succeeding digit. A single revolution of dial 20 represents a single telephone call as will hereinafter more fully appear. One complete revolution of dial 19 represents ten telephone calls, and one complete revolution of dial 18 indicates that 100 telephone calls have been made. Should it be desired to increase the capacity of the counter, this may be done by adding a fourth dial representing 1000 telephone calls, and if that be insufficient a fifth dial may also be added to represent 10,000 telephone calls.

A shaft 21 is connected to the counting mechanism of counter 15 and a sprocket 22 is fixedly mounted on said shaft 21. The elements thus far described constitute counter 15.

The actuating mechanism is also mounted in, or supported by a housing or framework 25. Slidably mounted in said housing 25 is the actuating rod proper 26, having a finger piece 27 affixed at one end thereof. It will be noted in Figs. 1 and 6 that when actuating rod 26 is in its normal position, its finger piece 27 occupies a position immediately above rotatable ring 28 which is mounted above, and concentric with, dial 29 of dial telephone 11. Not only is finger piece 27 positioned immediately above said rotatable ring, but it is also positioned immediately forward of stop member 30 of said dial telephone. When ring 28 is actuated in the usual manner to dial a number, the finger actuating said ring must contact stop member 30 as many times as there are call letters and numbers in the telephone number. In New York for example, and in most of the large metropolitan areas, each telephone number has two call letters and five call numbers which are significant for dialing purposes. The dial, and more particularly ring 28, must therefore be twirled clockwise seven times in order to dial a number in these large areas. Hence the finger or pencil or whatever is used to actuate ring 28 will encounter stop member 30 seven times for each telephone number which is dialed. Since finger piece 27 is positioned above ring 28 and immediately forward of stop member 30 the finger or pencil or whatever else is used to dial a number will also encounter said finger piece seven times for each number dialed or called. It will be recalled that finger piece 27 is mounted on the end of slidably mounted rod 26. Hence each time a telephone number is dialed, finger piece 27 will be pushed to the right, as seen in Fig. 1 and with it rod 26, once for each twirl of ring 28.

A spring 31 is fastened at one end to a bracket 32 affixed to housing 25 and at its opposite end it is fastened to a second bracket 33 fastened to rod 26. The tension of the spring acts in the opposite direction from the pushing force which is exerted upon finger piece 27 by the finger which twirls ring 28. Hence each time finger piece 27 is released spring 31 causes rod 26 to return to its normal position shown in Fig. 6. The sliding rod 26 is made of flexible material, thus enabling it to bend on its return to the normal position, and permitting said rod 26 to pass over the next adjacent tooth in sprocket wheel 22.

The operative position of rod 26 when it is pushed by the finger which twirls ring 28, is shown in Fig. 7. In this position it engages one of the teeth of the sprocket wheel 22 and causes said wheel to turn a given angular distance. It will be noted that there are seven teeth on sprocket 22 and hence the sprocket must be engaged by rod 26 seven times before it will complete one revolution. Since rod 26 will be actuated seven times during the course of dialing a single telephone number, all seven teeth of sprocket 22 will thereby be engaged and said sprocket will be caused to complete a single revolution. Sprocket wheel 22 is connected to the counting mechanism of counter 15 in such manner that one complete revolution of said wheel is reflected by a complete revolution of dial 20. It has been stated that a complete revolution of said dial represents a single telephone call and it will now be understood that this is so because it takes seven engagements of the dialing finger with finger piece 27 to cause one complete revolution of said dial 20.

There are times when twirling ring 28 does not necessarily result in making a telephone call for which a charge is made by the telephone company. For example, a wrong number may be dialed or the information operator may be called. Since counter 15 is intended to register and record only those telephone calls for which a charge is made, means should be provided of correcting the counter each time ring 28 is twirled and a telephone call for which a charge is made is not put through.

The simplest way of dealing with this situation is manually to turn sprocket wheel 22 in counter-clockwise direction until the dial reading on counter 15 is corrected. By the same token, if a single telephone call is charged at a multiple call rate, then sprocket wheel 22 should be turned in clockwise direction in order to correct the dial reading accordingly. To insure against accidental rotation of sprocket wheel 22 when said sprocket wheel is not being actuated by slidable rod 26, a flat spring 35 is provided and it will be noted in Fig. 6 that said flat spring bears peripherally against said sprocket wheel. Except when said sprocket wheel is caused to rotate in response to the action of slidable rod 26 thereon, said sprocket wheel is held in such position that flat spring 35 engages two of its teeth. This leaves the tooth which is diametrically opposite said flat spring in position for engagement by the slidable rod. It will be noted furthermore that the use of a flat spring in the manner shown permits of both clockwise and counter-clockwise rotation of the sprocket wheel when it is actuated by the slidable rod or manually, as the case may be.

The timing mechanism is also mounted on base 10, immediately adjacent counter 15 and slidable rod supporting housing 16. This timing mechanism includes a housing 40 which is fastened to the base by means of screws 41, and a time clock 42 mounted in said housing. Clock 42 is unique in that it has a minute hand 43 only, and further, in that it lacks a face or dial. No claim is herein being made to any special kind of clockwork mechanism since any conventional clock having its hour hand and face or dial preferably removed, would suffice for the purposes of this invention. The clock herein shown is mounted on a horizontal plane, so that its minute hand 43 swings around on a vertical axis.

Suspended above clock 42, by means of a supporting bracket 45 is a sprocket wheel 46 and a transparent disk-shaped dial 47. Said sprocket wheel and said dial are co-axial with each other and co-axial with clock 42 and more particularly with the axis on which minute hand 43 moves. The sprocket wheel and the transparent dial are frictionally fixed to each other and they are rotatably mounted on supporting bracket 45. Hence they are free to rotate on said bracket relative to the clock and more especially to the minute hand thereof. A pin 48 is fastened to transparent dial 47 and it will be seen especially in Fig. 5 that said pin extends downwardly from said dial and across the path of minute hand 43. If dial 47 is permitted to remain at rest, in due course of time minute hand 43 will sweep around until it engages pin 48. By the same token, dial 47 may be turned until its pin engages the minute hand.

Reference to Figs. 1 and 2 will show that connected to slidable rod 26 is a laterally extending arm 50 and that pivotally connected to said arm, on a horizontal pivot is a pawl 51. A pin 52 engages the pawl and prevents it from moving downwardly in clock-wise direction, beyond the position which it is shown to occupy in Fig. 2. The pawl is free however to turn in counter-clockwise direction, at least to a limited extent.

It will be noted that pawl 51 is so positioned with respect to rod 26, that it will engage the teeth of sprocket wheel 46 when said rod is actuated in the manner above described. Bearing in mind that slidable rod 26 is actuated seven times to make a single telephone call, sprocket wheel 46 is provided with a predetermined number of teeth, calculated to bring the dial pin 48 into engagement with the minute hand, irrespective of the relative positions of said minute hand and said pin at the time of dialing the telephone number. It will be understood that when the movement of slidable rod 26 causes a corresponding movement of pawl 51 said pawl will engage the teeth of sprocket wheel 46 and cause said sprocket wheel and the transparent dial which is frictionally attached thereto, to engage in angular movement, more particularly clockwise angular movement. Should it be found after slidable rod 26 is actuated only once or twice or any other number of times fewer than seven, that pin 48 is thereby brought into engagement with minute hand 43, further actuation of said slidable rod and hence of said pawl will merely result in causing slippage of sprocket wheel 46 with respect to dial 47. In other words further actuation of the slidable rod and of the pawl will cause further angular movement of the sprocket wheel, but not of the dial. Hence it will be found that at the conclusion of each dialing of a telephone number, pin 48 will abut minute hand 43 in the manner shown in Fig. 3.

Reference to Fig. 3 will disclose the fact that dial 47 is divided up by means of a plurality of radial lines into sectors. Each sector contains a plurality of dots 54, the space between adjacent dots, and the distance between each radial line and its adjacent dots, representing the distance travelled by the minute hand during the course of one minute. It will be noted that the minute hand will have to travel three minutes from the position which it is shown to occupy in Fig. 3 until it coincides with radial line 55, and a full five minutes must elapse from its starting time to the time it reaches the second radial line 55*a*. The sector representing the three minute interval indicates the initial three minute period of a long distance telephone call. The larger sector which includes the three minute sector and which covers an interval of five minutes, indicates the initial five minute period of local telephone calls. The sectors following the first five minute sector represent three minute or other intervals and in this connection it will be recalled that two and three message rate telephone calls are charged at a given rate for the first five minutes and at another rate for every succeeding three minute or other interval, in accordance with the rates set by the telephone company. Since the dial will always be in the position which it is shown to occupy in Fig. 3, relative to the minute hand, at the conclusion of each dialing operation, it will be apparent that the movement of the minute hand, following such dialing operation, will indicate the time interval elapsing between the beginning of the telephone call and its conclusion. The dial is also divided into zones, that zone which is farther removed from the dial center being applicable to double rate calls, the zone which is adjacent the dial center being applicable to triple rate calls or the zones may be reversed on said dial. The number on the dial 47, indicated by the minute hand 43, informs the user of the number of additional calls to add to the counter 15 by manual operation of the sprocket wheel 22 in the manner previously described. Dial 47 is also manually movable, especially when the pawl is out of engagement therewith to take care of such contingencies as may be abnormal from the point of view of the functioning of the timing device herein claimed.

It will be appreciated that the foregoing is descriptive of a preferred embodiment of this invention and that other embodiments may be had within the scope and spirit of the present invention. The method of suspending the transparent dial above the clock may, for example, be modified without departing from the basic principles of the invention. Modifications may be had in other structural aspects both of the timing and counting mechanisms hereinabove described. It may also be stated that should it be desired to make use of only one of these two mechanisms, that too may be done within the framework of this invention. For example, a counting device may be installed in connection with a given telephone, without at the same time installing the timing device, or vice-versa the timing device may be installed, unaccompanied by the counting device. If desired, a clock or other timepiece having both minute and hour hands may be employed in connection with the present invention. In such case however, use would be made principally, if not exclusively of the minute hand alone.

It should be further understood that while a slidable rod for the counter device was herein shown and described, a swinging arm similarly positioned could likewise be used to perform the same function, without departing from the spirit and scope of the invention.

In addition, slidable rod 26 may be lengthened, shortened, curved or angled to conform to the particular type of telephone with which the device is to be used.

The telephone call counting device (including the timer) hereinbefore described, is an attachment only in the sense of being functionally attached or connected. From the drawings and description it is obvious that there is no physical, binding connection, between the device and a dial telephone.

I claim:

1. An attachment for dial telephones, comprising a counter, a timer, and an actuator which is engageable both with the counter and the timer to actuate both, said actuator being positioned adjacent the telephone dial where it is engageable by the same means which is used to dial the telephone, whereby dialing the telephone actuates both the counter and the timer.

2. An attachment for dial telephones, said device comprising a counter, a timer, and an actuator which is engageable both with the counter and the timer to actuate both, said actuator being positioned adjacent the telephone dial where it is engageable by dialing the telephone, whereby dialing the telephone actuates both the counter and the timer, said counter and said timer having a reversible toothed wheel, and a toothed wheel respectively operatively connected thereto, said actuator consisting of a slidably movable member which is engageable with said wheels, said slidable member being caused to slide by dialing the telephone.

3. An attachment for dial telephones, comprising a counter, a timer and an actuator therefor, said counter comprising a counting mechanism having a reversible toothed wheel operatively connected thereto, said timer comprising a timepiece having a minute hand, a telephone call time charge computing dial mounted adjacent said minute hand, a projection on said dial which is engageable with said minute hand and a rotatably mounted toothed wheel operatively connected to said telephone call time charge computing dial, said actuator comprising slidably mounted member, which is positioned adjacent the dial of the telephone, with the upper end thereof forward of the stop member, where said slidable member is engageable by dialing the telephone to cause sliding movement of said member, the lower portion of said slidable member being positioned for engagement with the reversible toothed wheel on the counter and having pawl means positioned for engagement with the toothed wheel of the timer, whereby dialing of the telephone causes sliding movement of the slidable member and rotary movement of the reversible toothed wheel and toothed wheel respectively, thereby causing actuation of said counter and said timer.

4. An attachment for dial telephones, comprising a timer and an actuator therefor, said timer including a timepiece having a minute hand and comprising: a telephone call time charge computing dial mounted adjacent said minute hand, a projection on said dial which is engageable with said minute hand and a rotatably mounted toothed wheel operatively connected to said dial; an actuator positioned adjacent the dial of the telephone, said actuator being engageable by dialling the telephone to cause movement of said actuator to thereby actuate the toothed wheel, causing the computing dial with its projection to turn for at least eventual engagement with the minute hand.

5. A dial telephone attachment of the character described, comprising a base on which the dial telephone may be removably mounted, a counter and timer fixed to said base, and an actuator operatively connected to said counter and timer, said actuator being positioned adjacent the telephone dial where it is engageable by dialling the telephone, said base and said dialling furnishing the sole connections between said counter, timer and actuator on the one hand and said dial telephone on the other hand.

6. A dial telephone attachment of the character described, comprising a rotary counter having a reversible toothed wheel operatively connected thereto, a timer, and a single actuator for said timer and counter, said actuator being displaceable longitudinally of itself and having its forward end positioned adjacent the dial of the telephone where it is engageable by dialling the telephone, whereupon dialling the telephone causes to describe part of the line of a chord with respect to said telephone dial and the lower portion of said actuator to engage the reversible toothed wheel connected to the counter, an arm carried by said actuator, said arm actuating means operatively connected to the timer when the telephone is dialled, the dialling of the telephone actuating both the counter and the timer and furnishing the sole connection between the attachment and the telephone.

7. A dial telephone attachment of the characer described, comprising a rotary counter, a reversible toothed wheel operatively connected to said counter, and a slidable member positioned to engage said toothed wheel when moved longitudinally of itself, said member being positioned adjacent the telephone dial, the forward end of said member being engageable by dialling the telephone and describing part of the line of a chord with respect to said dial when actuated, whereby dialling the telephone causes slidable movement of said slidable member into engagement with the reversible toothed wheel to cause actuation of the rotary counter.

8. A dial telephone attachment of the character described, comprising a rotary counter, a reversible toothed wheel operatively connected to said counter, and a slidable member positioned to engage said toothed wheel when moved longitudinally of itself, said member being positioned adjacent the telephone dial, the forward end of said member being engageable by dialling the telephone and describing part of the line of a chord with respect to said dial when actuated, whereby dialling the telephone causes slidable movement of said slidable member into engagement with the reversible toothed wheel to cause actuation of the rotary counter, said toothed wheel having a plurality of teeth and being so connected to the counter that a single complete revolution of said toothed wheel registers a single call on said counter.

9. In a telephone call counting device including a counter having a reversible toothed wheel, an actuating mechanism for said counter: comprising a strip of material guided in longitudinal motion, the actuating end of said strip engaging one of the reversible toothed wheel teeth in thrust at an angle, thereby compelling rotation of said toothed wheel, said strip sliding over the next tooth to be engaged in returning to cocked position.

10. In a telephone call counting device including a counter having a reversible toothed wheel: a detent bearing peripherally against said toothed wheel to maintain the same in relative position, said detent being flexibly fabricated to permit rotation of said reversible toothed wheel in clockwise or counterclockwise direction, a strip of material guided in longitudinal motion, the actuating end of said strip engaging one of the reversible toothed wheel teeth in thrust at an angle, thereby compelling rotation of said toothed wheel, said strip sliding over the next tooth to be engaged in returning to cocked position.

11. An attachment for dial telephones, comprising a counter, a timer and an actuator which is engageable both with the counter and the timer to actuate both, said actuator being positioned adjacent the telephone dial, whereby dialling the telephone actuates both the counter and the timer.

12. An attachment for dial telephones, said device comprising a counter, a timer, and an actuator which is engageable both with the counter and the timer to actuate both, said actuator being positioned adjacent the telephone dial where it is engageable by dialing the telephone, whereby dialing the telephone actuates both the counter and the timer, said counter and said timer having respectively a reversible toothed wheel and a toothed wheel operatively connected thereto.

13. An attachment for dial telephones in accordance with claim 4, the telephone call time charge computing dial of the timer having a plurality of spaced intervals defining successive specific angular distances swept by the minute hand, with one specific angular distance denoting an initial fixed period of elapsed time and subsequent successive specific angular distances each denoting a second fixed period of elapsed time, with said initial fixed period of elapsed time and said secondary fixed periods of elapsed time enumerated in terms of pertinent time chargeable call units.

14. An attachment for dial telephones in accordance with claim 4, the telephone call time charge computing dial of the timer having a plurality of spaced intervals defining successive specific angular distances swept by the minute hand, with one specific angular distance denoting an initial fixed period of elapsed time and subsequent successive specific angular distances each denoting a second fixed period of elapsed time, a second set of spaced intervals defining successive specific angular distances swept by the minute hand, with one specific angular distance each denoting an initial fixed period of elapsed time, and subsequent successive specific angular distances each denoting a second fixed period of elapsed time related to this set, with said initial and secondary fixed periods of elapsed time in both sets of spaced intervals enumerated in terms of pertinent time chargeable call units.

15. In combination with the minute hand of a timepiece, a telephone call time charge computer for directly indicating the pertinent number of chargeable unit calls resulting from each time chargeable call: comprising a dial having a starting point and a plurality of spaced intervals, said intervals defining successive specific angular distances swept by the minute hand, with one specific angular distance denoting an initial fixed period of elapsed time and subsequent successive specific angular distances each denoting a second fixed period of elapsed time, with said initial fixed period of elapsed time and said secondary fixed periods of elapsed time corresponding to time chargeable unit calls and enumerated in terms of pertinent time chargeable unit calls, said starting point on the dial and said timepiece minute hand being coincided; at the start of a time chargeable call.

16. In combination with the minute hand of a timepiece, a telephone call time charge computer for directly indicating the pertinent number of chargeable unit calls resulting from each time chargeable call: comprising a dial having a starting point and a plurality of spaced intervals, said intervals defining successive specific angular distances swept by the minute hand, with one specific angular distance denoting an initial fixed period of elapsed time and subsequent successive specific angular distances each denoting a second fixed period of elapsed time, a second set of spaced intervals defining successive specific angular distances swept by the minute hand, with one specific angular distance denoting an initial fixed period of elapsed time, and subsequent successive specific angular distances each denoting a second fixed period of elapsed time related to this set, with said initial fixed period of elapsed time and said secondary fixed periods of elapsed time in both sets of spaced intervals corresponding to time chargeable unit calls and enumerated in terms of pertinent time chargeable unit calls, said starting point on the dial and said timepiece minute hand being coincided at the start of a time chargeable call, whereby motion of the minute hand relative to the dial enables a direct indication of the pertinent number of time chargeable unit calls consumed at the end of the time chargeable call.

17. In combination with the minute hand of a timepiece, a telephone call time charge computer for directly indicating the pertinent number of chargeable unit calls resulting from each time chargeable call: comprising a dial having a starting point and a plurality of spaced intervals, said intervals defining successive specific angular distances swept by the minute hand, with one specific angular distance denoting a five minute period of elapsed time and subsequent successive specific angular distances each denoting a three minute period of elapsed time, with said five minute period of elapsed time and said three minute periods of elapsed time corresponding to time chargeable unit calls and enumerated in terms of pertinent time chargeable unit calls, commencing with the five minute angular distance enumerated to read two, and each of the successive three minute angular distances consecutively increased by one unit to read three, four, five, six, etc., respectively, said starting point on the dial and said timepiece minute hand being coincided at the start of a time chargeable call, whereby motion of the minute hand relative to the dial enables a direct indication of the number of time chargeable unit calls consumed at the end of the time chargeable call.

18. In combination with the minute hand of a timepiece, a telephone call time charge computer for directly indicating the pertinent number of chargeable unit calls resulting from each time chargeable call: comprising a dial having a starting point and a plurality of spaced intervals, said intervals defining successive specific angular distances swept by the minute hand, with one specific angular distance denoting a five minute period of elapsed time and subsequent successive specific angular distances each denoting a two minute period of elapsed time, with said five minute period of elapsed time and said two minute periods of elapsed time corresponding to time chargeable unit calls and enumerated in terms of pertinent time chargeable unit calls, said starting point on the dial and said timepiece minute hand being coincided at the start of a time chargeable call, whereby motion of the minute hand relative to the dial enables a direct indication of the pertinent number of time chargeable unit calls consumed at the end of the time chargeable call.

19. In combination with the minute hand of a timepiece, a telephone call time charge computer for directly indicating the pertinent number of chargeable unit calls resulting from each time chargeable call: comprising an adjustable dial having a starting point and a plurality of spaced intervals, said intervals defining successive specific angular distances swept by the minute hand, with one specific angular distance denoting an initial fixed period of elapsed time and subsequent successive specific angular distances each denoting a second fixed period of elapsed time, with said initial fixed period of elapsed time and said secondary fixed periods of elapsed time corresponding to time chargeable unit calls and enumerated in terms of pertinent time chargeable unit calls, said dial having a projection thereon for engaging the minute hand of said timepiece, said adjustable dial being set at the start of a time charge computation with its projection engaging said minute hand in a manner permitting free rotation of said minute hand in clockwise direction, said dial projection being positioned on the dial to coincide said starting point with the minute hand when the dial projection engages said minute hand, whereby motion of the minute hand relative to the dial enables a direct indication of the pertinent number of time chargeable unit calls consumed at the end of the time chargeable call.

20. In combination with the minute hand of a timepiece, a telephone call time charge indicator for distinctly indicating the approach of the next additional unit call time charge: comprising a dial having a starting point and a plurality of spaced intervals, said intervals defining successive specific angular distances swept by the minute hand with one specific angular distance denoting an initial fixed period of elapsed time and subsequent successive specific angular distances each denoting a second fixed period of elapsed time, with said initial fixed period of elapsed time and said secondary fixed periods of elapsed time corresponding to time chargeable unit calls, said starting point on the dial and said time piece minute hand being coincided at the start of a time chargeable call.

HENRY FEINSTEIN.

REFERENCES CITED

The following references are of record in the file of this patent:

UNITED STATES PATENTS

| Number | Name | Date |
|---|---|---|
| 1,474,053 | Martin | Nov. 13, 1923 |
| 1,897,533 | Richey | Feb. 14, 1933 |
| 2,072,657 | Varley | Mar. 2, 1937 |
| 2,075,056 | Rich | Mar. 30, 1937 |
| 2,115,280 | Perlman | Apr. 26, 1938 |
| 2,462,839 | Brown | Mar. 1, 1949 |

FOREIGN PATENTS

| Number | Country | Date |
|---|---|---|
| 171,185 | Switzerland | Nov. 16, 1934 |